(12) United States Patent  (10) Patent No.: US 9,182,789 B2
Hill et al.  (45) Date of Patent: Nov. 10, 2015

(54) TRANSPARENT ELECTRONIC DEVICE COMPONENTS WITH OPAQUE EDGE COVERINGS

(75) Inventors: Matthew Hill, Mountain View, CA (US); Richard Hung Minh Dinh, San Jose, CA (US); Lucy E. Browning, London (GB); Lee Hua Tan, Singapore (SG); Tang Yew Tan, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 456 days.

(21) Appl. No.: 13/037,722

(22) Filed: Mar. 1, 2011

(65) Prior Publication Data

US 2012/0225258 A1  Sep. 6, 2012

(51) Int. Cl.
  *B32B 3/02* (2006.01)
  *G06F 1/16* (2006.01)

(52) U.S. Cl.
  CPC ............... *G06F 1/1656* (2013.01); *B32B 3/02* (2013.01); *Y10T 428/24777* (2015.01)

(58) Field of Classification Search
  CPC .................................................. H01H 2210/00
  See application file for complete search history.

(56) References Cited

U.S. PATENT DOCUMENTS

| D118,749 | S | 1/1940 | Zimmerman | |
|---|---|---|---|---|
| D124,596 | S | 1/1941 | Arenberg | |
| 2,269,554 | A | 1/1942 | Rolph | |
| 4,403,224 | A | 9/1983 | Wirnowski | |
| 4,995,941 | A | 2/1991 | Nelson et al. | |
| 5,456,955 | A * | 10/1995 | Muggli | 427/555 |
| 5,514,319 | A * | 5/1996 | Young | 264/132 |
| 5,681,515 | A | 10/1997 | Pratt et al. | |
| 5,867,149 | A * | 2/1999 | Jaeger | 345/172 |
| 5,932,329 | A | 8/1999 | Frost et al. | |
| 6,058,293 | A | 5/2000 | Phillips | |
| 6,229,993 | B1 | 5/2001 | Greenaway et al. | |
| 6,266,685 | B1 | 7/2001 | Danielson et al. | |
| 6,323,846 | B1 | 11/2001 | Westerman et al. | |
| 6,462,890 | B2 | 10/2002 | Hsu | |

(Continued)

FOREIGN PATENT DOCUMENTS

EP  0458016 A1  11/1991
JP  6-94848  4/2004

(Continued)

OTHER PUBLICATIONS

Lu, "Liquid Optically Clear Adhesives for display Applications", Henkeina.com, Apr. 1, 2001, pp. 1-4.

(Continued)

*Primary Examiner* — Gerard Higgins
*Assistant Examiner* — Sathavaram I Reddy

(57) ABSTRACT

An electronic device may have components such as button members, display cover glass layers, structures associated with connector ports, and other components. The components may have transparent and opaque structures. The transparent structures may be formed on top of the opaque structures. The transparent structures may have peripheral edges through which light may pass. To help prevent the appearance of the components from becoming degraded by the presence of dirt, at least some of the edge portions of the transparent structures may be covered with an opaque covering material. The opaque covering material may be formed from paint or sidewall structures that are formed as an integral part of the opaque structures.

16 Claims, 13 Drawing Sheets

(56) References Cited

U.S. PATENT DOCUMENTS

| | | |
|---|---|---|
| 6,510,226 B1 | 1/2003 | Thomann et al. |
| 6,796,708 B2 | 9/2004 | Kawamata et al. |
| 6,842,288 B1 | 1/2005 | Liu et al. |
| 6,876,543 B2 | 4/2005 | Mockridge et al. |
| 6,965,789 B2 | 11/2005 | Hauge et al. |
| 6,980,095 B2 | 12/2005 | Wright et al. |
| 7,031,148 B1 | 4/2006 | Lin |
| 7,046,230 B2 | 5/2006 | Zadesky et al. |
| 7,073,916 B2 | 7/2006 | Yin et al. |
| 7,236,588 B2 | 6/2007 | Gartrell |
| D606,539 S | 12/2009 | Liao et al. |
| 7,636,244 B2 | 12/2009 | Kriege et al. |
| 7,697,281 B2 | 4/2010 | Dabov et al. |
| 7,711,256 B2 | 5/2010 | Wun |
| 7,872,861 B2 | 1/2011 | Ou et al. |
| 7,933,123 B2 | 4/2011 | Wang et al. |
| 8,004,835 B2 | 8/2011 | Conti et al. |
| 8,023,261 B2 | 9/2011 | Sanford |
| 8,320,978 B2 | 11/2012 | Chang et al. |
| 8,797,721 B2 | 8/2014 | Pakula et al. |
| 2003/0006128 A1 | 1/2003 | Giles et al. |
| 2003/0045246 A1 | 3/2003 | Lee et al. |
| 2003/0108720 A1* | 6/2003 | Kashino ............... 428/189 |
| 2003/0164905 A1 | 9/2003 | Yamaoka et al. |
| 2003/0184894 A1 | 10/2003 | Bischof et al. |
| 2004/0022017 A1 | 2/2004 | Chuang |
| 2004/0042168 A1 | 3/2004 | Yang et al. |
| 2004/0079457 A1 | 4/2004 | Kimura et al. |
| 2005/0052425 A1 | 3/2005 | Zadesky et al. |
| 2005/0083308 A1 | 4/2005 | Homer et al. |
| 2005/0286214 A1 | 12/2005 | Chen |
| 2006/0132644 A1 | 6/2006 | Shangguan et al. |
| 2006/0158839 A1 | 7/2006 | Deluga |
| 2006/0197750 A1 | 9/2006 | Kerr et al. |
| 2006/0239746 A1* | 10/2006 | Grant ............... 400/490 |
| 2006/0268528 A1 | 11/2006 | Zadesky et al. |
| 2007/0025072 A1 | 2/2007 | Liao |
| 2007/0052679 A1 | 3/2007 | Liang |
| 2007/0173299 A1 | 7/2007 | Sawayama et al. |
| 2007/0257398 A1 | 11/2007 | Moncrieff |
| 2008/0062660 A1 | 3/2008 | Weber et al. |
| 2008/0092809 A1* | 4/2008 | Lin et al. ............... 118/301 |
| 2008/0131683 A1 | 6/2008 | Ristic-Lehmann et al. |
| 2008/0146293 A1 | 6/2008 | Kim et al. |
| 2008/0166009 A1 | 7/2008 | Dinh et al. |
| 2008/0206492 A1 | 8/2008 | Husemann et al. |
| 2008/0239647 A1 | 10/2008 | Luo et al. |
| 2008/0264548 A1 | 10/2008 | Zhang |
| 2008/0266766 A1 | 10/2008 | D'Urso et al. |
| 2008/0316117 A1 | 12/2008 | Hill et al. |
| 2009/0002930 A1 | 1/2009 | Nakanishi et al. |
| 2009/0046072 A1 | 2/2009 | Emig et al. |
| 2009/0046240 A1 | 2/2009 | Bolton |
| 2009/0054115 A1 | 2/2009 | Horrdin et al. |
| 2009/0059485 A1 | 3/2009 | Lynch et al. |
| 2009/0059502 A1 | 3/2009 | Filson et al. |
| 2009/0065136 A1 | 3/2009 | Nadella et al. |
| 2009/0093575 A1 | 4/2009 | Kabashima et al. |
| 2009/0245564 A1 | 10/2009 | Mittleman et al. |
| 2009/0257207 A1 | 10/2009 | Wang et al. |
| 2010/0014232 A1 | 1/2010 | Nishimura |
| 2010/0060563 A1 | 3/2010 | Hayton et al. |
| 2010/0061040 A1 | 3/2010 | Dabov et al. |
| 2010/0089729 A1 | 4/2010 | Li et al. |
| 2010/0091442 A1 | 4/2010 | Theobald et al. |
| 2010/0120480 A1 | 5/2010 | Jung |
| 2010/0149410 A1 | 6/2010 | Matsuzawa |
| 2010/0190530 A1 | 7/2010 | Wade et al. |
| 2010/0203924 A1 | 8/2010 | Hirota |
| 2010/0283394 A1 | 11/2010 | Ong |
| 2011/0086676 A1 | 4/2011 | Choi et al. |
| 2011/0096483 A1 | 4/2011 | Sapper et al. |
| 2011/0164365 A1 | 7/2011 | McClure et al. |
| 2011/0165361 A1 | 7/2011 | Sherman et al. |
| 2011/0186345 A1 | 8/2011 | Pakula et al. |
| 2011/0187245 A1 | 8/2011 | Pakula et al. |
| 2011/0188180 A1 | 8/2011 | Pakula et al. |
| 2011/0215685 A1 | 9/2011 | Jarvis et al. |
| 2011/0255227 A1 | 10/2011 | Murakami |
| 2012/0113611 A1 | 5/2012 | Maniar et al. |
| 2012/0118628 A1 | 5/2012 | Pakula et al. |
| 2012/0275088 A1 | 11/2012 | Huang |

FOREIGN PATENT DOCUMENTS

| | | |
|---|---|---|
| JP | A 2006-276623 | 10/2006 |
| JP | A 2009/259908 | 11/2009 |
| JP | A 2010-091742 | 4/2010 |
| WO | WO 2008/035736 | 3/2008 |
| WO | 2009/024842 A1 | 2/2009 |
| WO | 2009/126480 A2 | 10/2009 |
| WO | 2010/033571 | 3/2010 |
| WO | WO 2010/074144 | 7/2010 |
| WO | 2010/101961 A2 | 9/2010 |

OTHER PUBLICATIONS

Henkel, "Loctite Liquid Optically Clear Adhesives", Henkeina.com, downloaded Mar. 18, 2013, pp. 1-2.

* cited by examiner

TRANSPARENT ELECTRONIC DEVICE COMPONENTS WITH OPAQUE EDGE COVERINGS

BACKGROUND

This relates generally to electronic devices with transparent members, and more particularly, to ways in which to provide these members with enhanced immunity to contamination with dirt.

Electronic devices often include structures that are formed from glass or clear plastic. For example, a menu button in an electronic device may have a transparent layer and an opaque layer. The transparent layer may be formed on the surface of the opaque layer to enhance its appearance.

During normal use of an electronic device, a user may expose the electronic device to environments that contain dirt, dust, and other foreign particles. These particles can become trapped in the crevices of the electronic device. For example, dirt can become trapped along the edges of a transparent button member.

The presence of dirt along the edges of a transparent button member can have a significant impact on the appearance of the button member. If, for example, the button member has a white color, the appearance of the button will be sensitive to the amount of light that enters the edge of the transparent portion of the button member. When dirt is present, light will be prevented from entering the edge of the transparent portion of the button member and the button member may appear darker than normal. This darkening effect may detract from the overall white appearance of the button.

It would therefore be desirable to be able to provide ways in which to provide transparent structures in electronic devices with enhanced immunity to contamination with dirt.

SUMMARY

Electronic devices may be provided that include components with transparent portions and opaque portions. A button member may, for example, have a transparent layer of plastic or glass or other material that is formed on top of an opaque layer of plastic or other opaque substance. Other components may also have transparent structures formed over opaque layers such as keys in a keyboard, input-output port cover structures, and other device structures.

The transparent layer in the button member, keyboard key, port cover, or other component may have a peripheral edge. A covering material may be used to cover at least some of the surface area of the edge, thereby improving immunity to dirt on the edge. The covering material may be formed from a light material such as white plastic or white paint to help reflect light into the transparent material and thereby brighten the appearance of the button member or other component. The covering material may be formed as an integral portion of the opaque layer or as a separate structure.

Further features of the invention, its nature and various advantages will be more apparent from the accompanying drawings and the following detailed description of the preferred embodiments.

DETAILED DESCRIPTION

Figure 1:
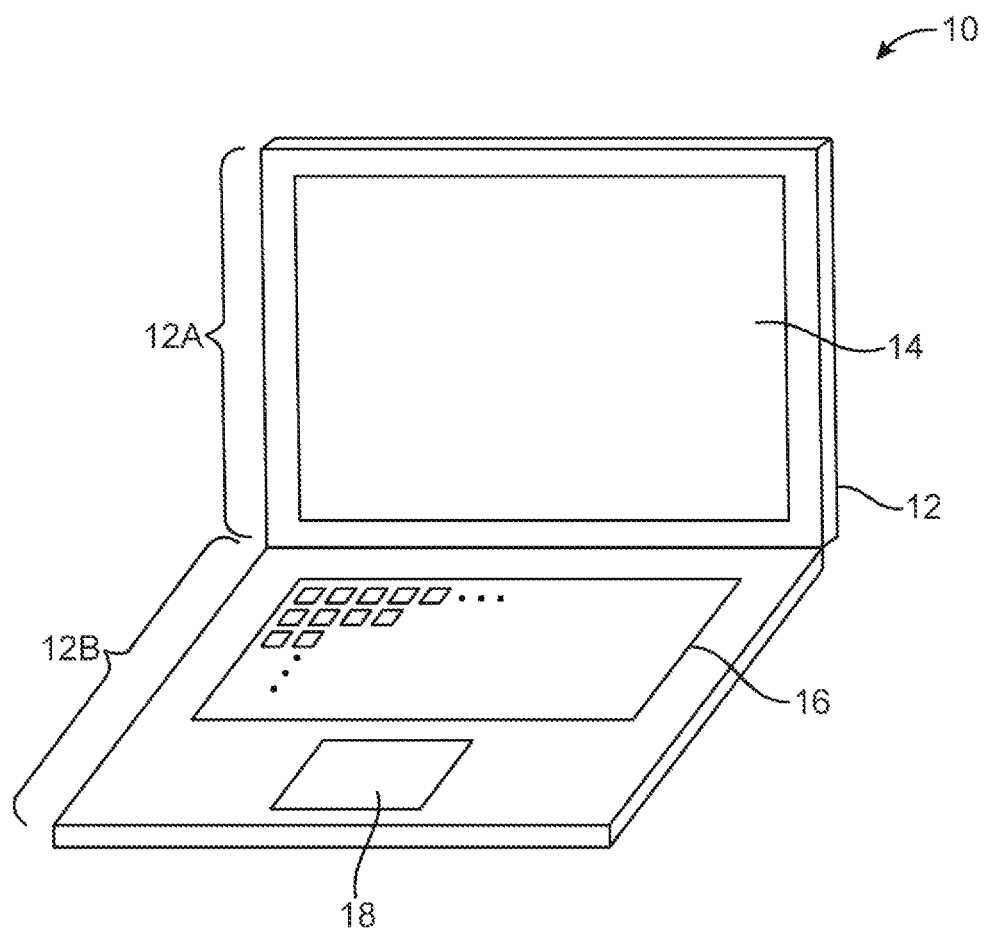
FIG. 1 is a perspective view of an illustrative electronic device such as a laptop computer that may include transparent and opaque structures in accordance with an embodiment of the present invention.

Electronic devices may include transparent structures. The transparent structures may include structures formed from glass, plastic, ceramics, or other materials that transmit visible light. In some situations, the transparent structures may have a clear appearance. In other situations, the transparent structures may have a milky or cloudy appearance (i.e., the structures may be considered to be translucent). These structures are collectively referred to herein as transparent structures.

Transparent structures may be used in forming portions of buttons, labeled keys for a keyboard, structures in a display such as a cover layer (e.g., cover glass), or other electronic device structures. Transparent structures may sometimes be formed on top of opaque structures (i.e., solid or somewhat translucent light-blocking structures). For example, a button may be formed using a two-shot injection molding process in which a clear shot of plastic is used to cover an opaque shot of plastic. The opaque shot of plastic may have a solid color, a pattern, etc. Examples of colors that the opaque plastic may have include white, black, silver, grey, blue, red, yellow, etc.

In displays and other components that produce light, the transparency of the transparent structures may be required for proper functioning of the component. For example, display cover glass layers must be clear in order to allow users to view the images that are formed on the active portion of the display. In other applications, transparent electronic device structures may be used to enhance device aesthetics. For example, placing a clear layer of plastic on top of an opaque layer of plastic in a button structure or keyboard key may help provide the button or key with an attractive appearance.

When a user places an electronic device in different environments, the electronic device is exposed to dirt (e.g., dust, soil, food particles, and other foreign materials). The dirt may become lodged in cracks and other openings within the device. This may cause the edges of transparent structures such as buttons and other device structures to become coated with dirt. The dirt may prevent light from entering the transparent structures and may therefore alter the appearance of underlying opaque structures. A white button may, for example, appear soiled when the edges of the button are covered with dirt, even though the rest of the button is clean.

To prevent the presence of dirt from adversely affecting the appearance of electronic device structures that include transparent structures, at least part of the surfaces of the edges of the transparent structures may be covered with an opaque material (i.e., a solid or translucent light-blocking material). The opaque material is preferably able to block all or at least a substantial fraction (e.g., more than half) of the light that would otherwise enter the transparent material along its edges, thereby making the structure that is coated with the transparent material immune to the presence of dirt along its edges. If desired, the opaque material may be formed from a reflective material such as a white, silver, or light grey material, that helps reflect light within the transparent material and thereby brighten the structure.

Figure 2:
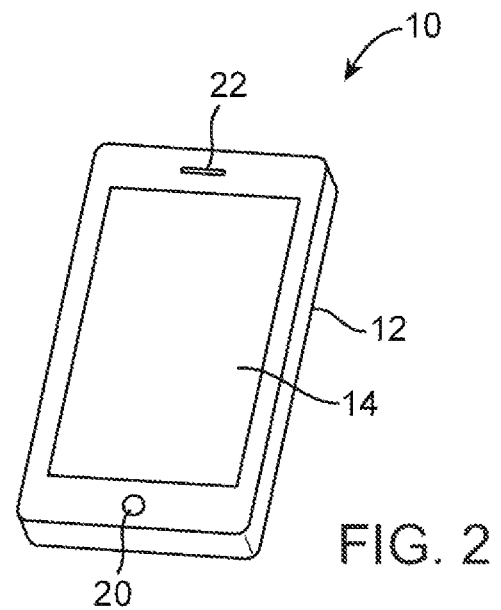
FIG. 2 is a perspective view of an illustrative electronic device such as a handheld electronic device that may include transparent and opaque structures in accordance with an embodiment of the present invention.
Figure 3:
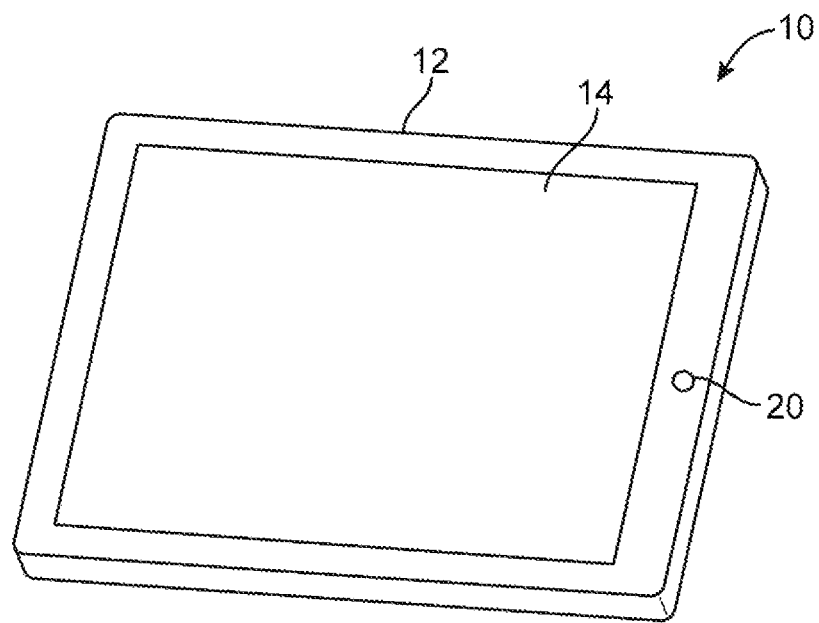
FIG. 3 is a perspective view of an illustrative electronic device such as a tablet computer that may be provided with transparent and opaque structures in accordance with an embodiment of the present invention.

Illustrative electronic devices that may be provided with transparent structures are shown in FIGS. 1, 2, and 3. FIG. 1 shows how electronic device 10 may have the shape of a laptop computer having upper housing 12A and lower housing 12B with components such as keyboard 16 and touchpad 18. FIG. 2 shows how electronic device 10 may be a handheld device such as a cellular telephone, music player, gaming device, navigation unit, or other compact device. FIG. 3 shows how electronic device 10 may be a tablet computer. These are merely illustrative examples. Electronic devices such as illustrative electronic device 10 of FIGS. 1, 2, and 3 may be laptop computers, computer monitors with embedded computers, tablet computers, cellular telephones, media players, other handheld and portable electronic devices, smaller devices such as wrist-watch devices, pendant devices, headphone and earpiece devices, other wearable and miniature devices, or other electronic equipment.

Device 10 may have a housing such as housing 12. Housing 12, which is sometimes referred to as a case, may be formed of materials such as plastic, glass, ceramics, carbon-fiber composites and other composites, metal, other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Device 10 may have one or more displays such as display 14. Display 14 may be a liquid crystal display, an organic light-emitting diode display, or a display that uses other types of display technology. Display 14 may, if desired, include capacitive touch sensor electrodes for a capacitive touch sensor array or other touch sensor structures (i.e., display 14 may be a touch screen). The outermost layer of display 14 may be covered with a transparent cover layer formed from plastic or glass (sometimes referred to as display cover glass). If desired, the interior surface of peripheral inactive portions of display 14 may be provided with an opaque masking layer on such as black ink. The center active portion of display 14 may be used to present text and images to a user of device 10.

The inactive portions of display 14 (i.e., the cover glass in the inactive portions of display 14) may be provided with openings. For example, an opening may be formed at the upper end of device 10 of FIG. 2 to serve as speaker port 22 and openings may be provided in the cover glass of display 14 of FIGS. 2 and 3 to accommodate buttons such as buttons 20.

Figure 4:
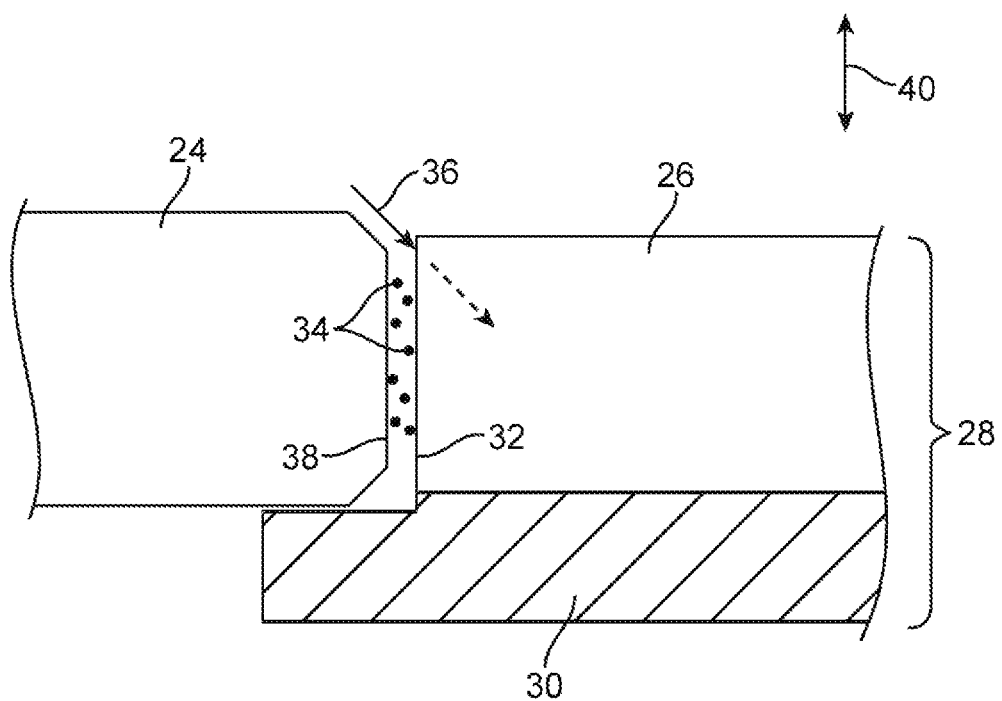
FIG. 4 is a cross-sectional side view of a conventional button member that moves within an opening in a cover glass layer and that is susceptible to contamination with dirt along its edges.

A cross-sectional side view of a conventional round menu button is shown in FIG. 4. Button member 28 may be formed using at two-shot plastic molding process and may include transparent upper member 26 and opaque lower member 30. Button member 28 may be mounted in an opening in cover glass layer 24. To allow button member 28 to move freely in directions 40, button member 28 has a diameter that is somewhat smaller than the diameter of the hole in glass layer 24. As a result, there is a gap between the inner hole edge (edge 38) of cover glass layer 24 and the outer edge of button member 28 (outer edge 32 of transparent member 26).

When exposed to normal use, dirt 34 may accumulate in the gap between edges 38 and 32 and can coat these edges. This blocks light 36 from reaching the interior of transparent layer 26 and can have an undesirable impact on the appearance of button member 28.

A white button using the conventional design of FIG. 4 that becomes coated along its edge with dirt may appear grey. Buttons of other colors may also become unsightly when their edges become dirty. To prevent undesirable discoloration of buttons and other components with transparent structures, edge coverings may be provided. The edge coverings may be provided in the form of a thin coating of a material such as paint or may be provided in the form of plastic sidewall structures or sidewalls of other materials that cover some or all of the edge portions of the transparent structures. The edge coverings may be used in buttons, display glass layers, or other device components with transparent structures.

Figure 5:
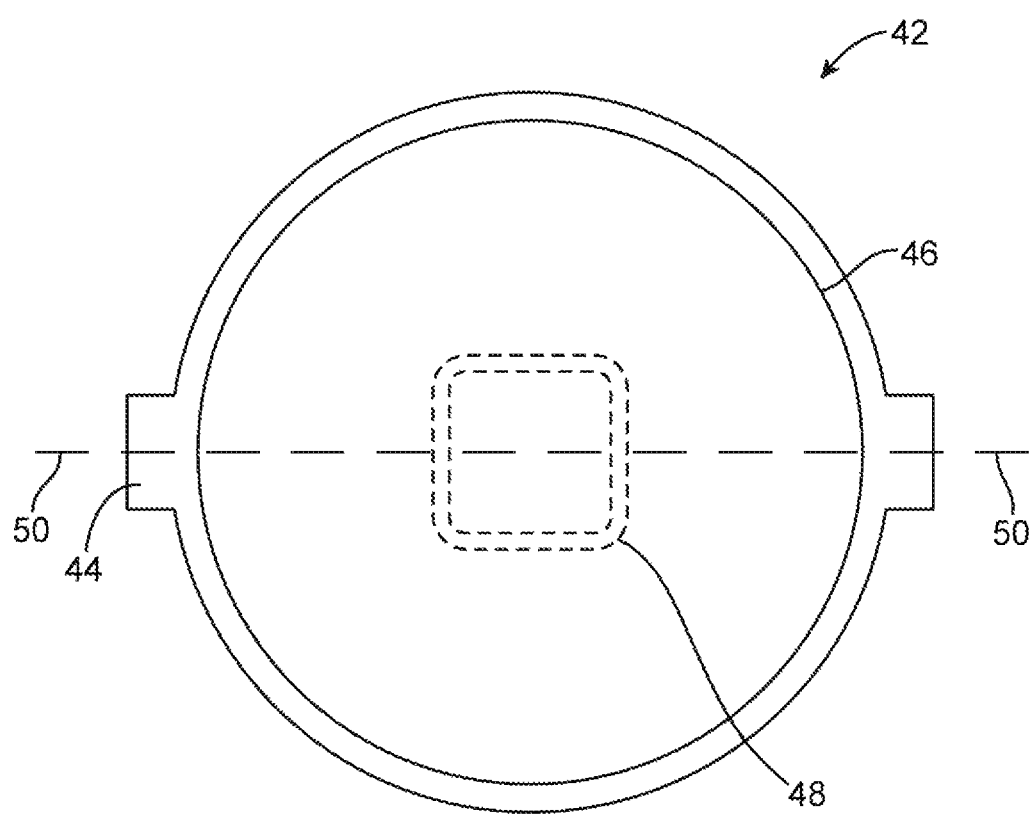
FIG. 5 is a top view of an illustrative button member in accordance with an embodiment of the present invention.

FIG. 5 is a top view of an illustrative button of the type that may be provided with edge coverings. As shown in FIG. 5, button 42 (e.g., a button of the type illustrated as button 20 of FIGS. 2 and 3) may have a circular outline (i.e., a disk shape). Button 42 may be formed from glass, plastic, ceramic, or other suitable materials. With one suitable arrangement, which is sometimes described herein as an example, button 42 may be formed from molded plastic. A two-shot molding process may, for example, be used to create respective clear and opaque portions of button 42. With this type of arrangement, button 42 may have a lower opaque layer such as layer 44 and an upper (outer) transparent layer such as layer 46. If desired, button 42 may be provided with an icon, letter, or other information such as label 48 of FIG. 5. Label 48 may be formed by patterning layer 44 to create an opening into which layer 46 extends and by coating the underside of button 42 with ink or by coating the underside of layer 46 with printed ink or using other labeling techniques.

Figure 6:
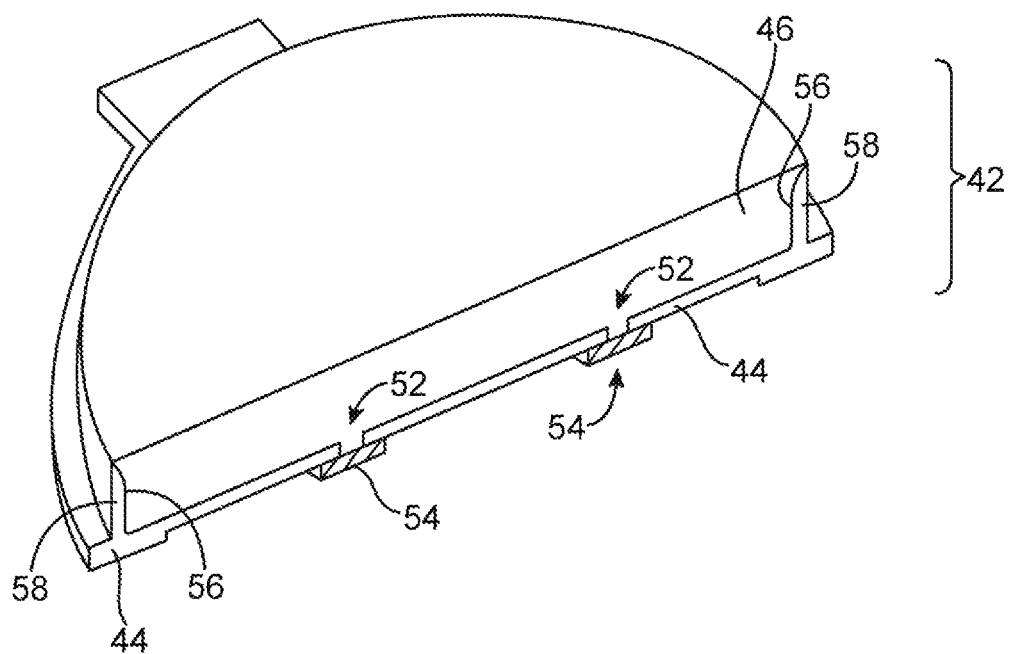
FIG. 6 is a perspective view of a button member having a transparent portion and a sidewall portion that covers at least part of the surface of the edge of the transparent portion in accordance with an embodiment of the present invention.
Figure 7:
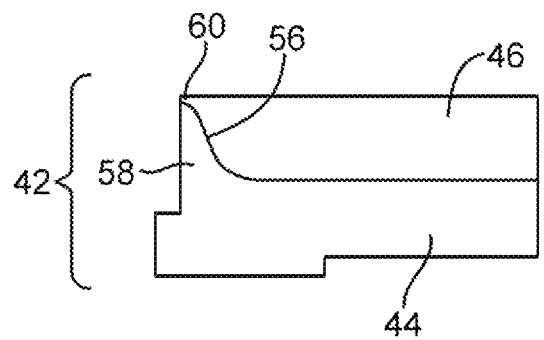
FIGS. 7, 8, 9, and 10 are cross-sectional side views of illustrative button members showing how sidewall portions of the button members may use different shapes for covering transparent edge portions of the button members in accordance with in accordance with embodiments of the present invention.
Figure 8:
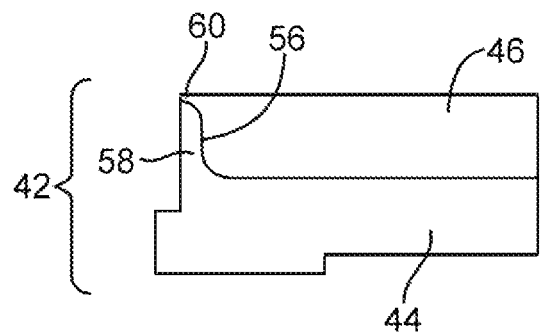
Figure 9:
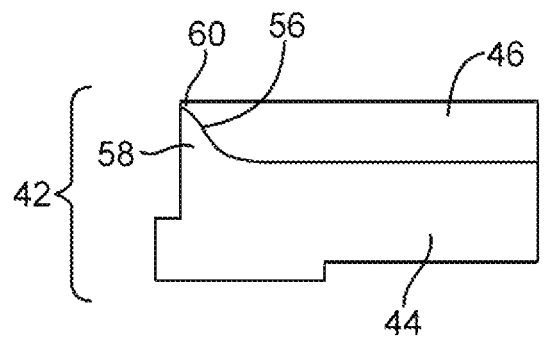

FIG. 6 is a perspective cross-sectional view of button 42 of FIG. 5 sectioned along line 50 of FIG. 5. As shown in FIG. 6, opaque portion 44 of button 42 may have openings 52 through which some of transparent portion 46 of button 42 protrudes. The underside of button 42 (at least the portion under openings 52) may be coated with ink such as silver ink 54. Ink 54 and the pattern formed by openings 52 may be used to form label 48 of FIG. 5 (as an example).

Some or all of the surface of peripheral edge 56 of transparent structure 46 may be covered with an opaque layer of covering material. In the example of FIG. 6, the cover layer structure has been formed by a vertically protruding portion of opaque lower member 44 that forms opaque sidewall 58. Member 44 and sidewall portion 58 may have any suitable color (e.g., white, black, grey, silver, red, yellow, blue, etc.). The presence of dirt may be particularly influential on the appearance of transparent structures that lie over lightly colored opaque layers. Accordingly, the use of sidewalls 58 may be particularly helpful in preserving the appearance of button 42 when opaque lower member 44 is formed from a lightly colored material such as white plastic or lightly colored plastic. The use of a highly reflective color for sidewalls 58 such as white, silver, light gray, etc., may help reflect light within transparent layer 46 and may therefore help provide button 42 with a light appearance. In general, structures 44 and 58 may be formed from ink, plastic, ceramic, metal, other covering materials, or combinations of these materials.

Button 42 may be formed using molded plastic. With this type of arrangement, a two-shot molding process may be used to form an integrated button. One shot of the two-shot molding process may be used to form transparent member 46 and another shot of the two-shot molding process may be used to form opaque member 44 and sidewall structures 58.

Figure 10:
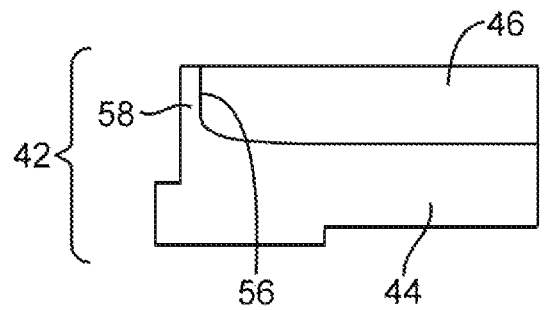

FIGS. 7, 8, 9 and 10 are cross-sectional side views of button 42 in the vicinity of sidewall covering structures 58. In the illustrative configurations of FIGS. 7, 8, and 9, portion 60 of transparent member 46 protrudes over the lip of sidewall structures 58 and sidewall structure 58 and opaque layer 44 are formed from an integral structure such as a piece of plastic. A transparent layer such as layer 46 of FIGS. 7, 8, and 9 that covers the top edge of sidewall structures 58 may be used when it is desirable to cover the entire exposed surface of button 42 with transparent material to achieve a consistent appearance for button 42 or when a layer of this shape facilitate plastic molding operations. In the example of FIG. 10, sidewall structure 58 extends along the entire height of edge 56, to provide maximum dirt protection.

Figure 11:
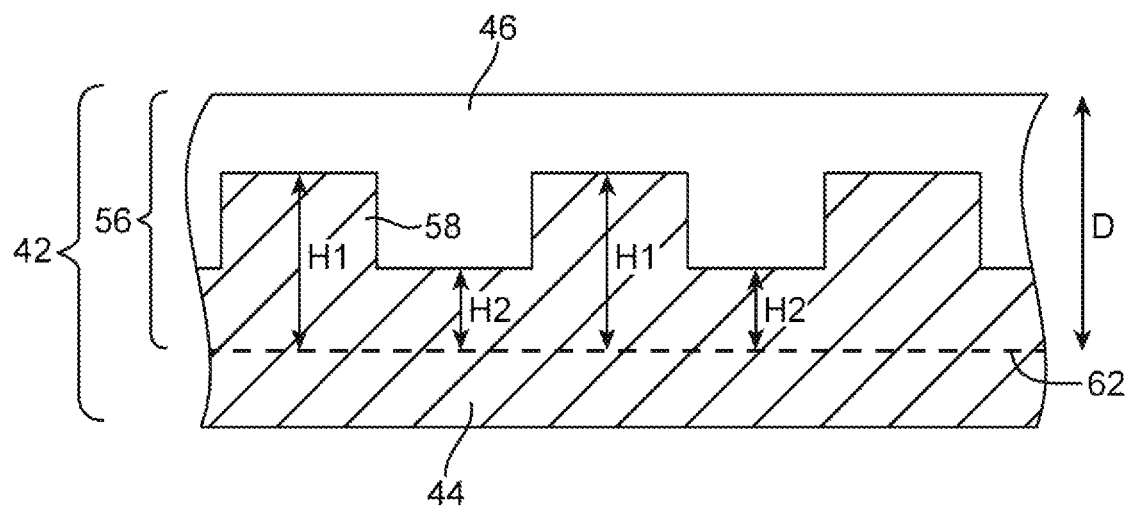
FIG. 11 is a side view of a transparent member having an edge that is at least partly covered by a sidewall material in accordance with an embodiment of the present invention.

If desired, sidewall structure 58 may have different heights at different portions along the edge of button 42. As shown in the illustrative side view of button 42 of FIG. 11, transparent member 46 may extend to a depth D, as indicated by dashed line 62. Opaque member 44 may have integral sidewall structures 58 that have different heights H1 and H2 at different portions along the edge of button 42. With this type of configuration, sidewall structures 58 may be used to cover at least some of the edge of transparent structures 46. To ensure that transparent structures 46 are at least somewhat immune to the presence of dirt on the edge of transparent structures 46, the surface area of edge 56 is preferably at least half (50%) covered with structures 58 (i.e., the surface area of edge 56 of transparent structures 46 is at least 50% covered with opaque structures 58, is at least 70% covered with opaque structures 58, is at least 85% covered with opaque structures 58, etc.). The corrugated shape of structures 58 in FIG. 11 is illustrative. Other shapes may be used for the opaque structures that cover the edge of transparent structures 46 if desired.

Figure 12:
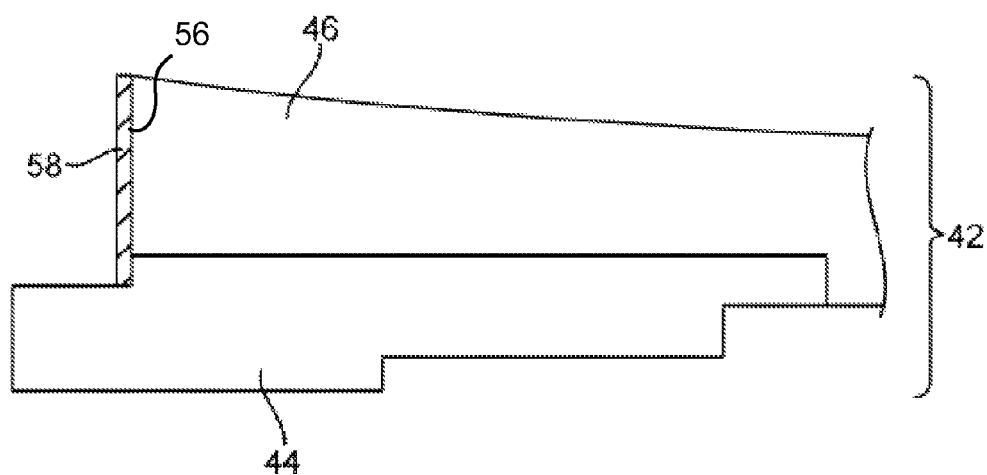
FIG. 12 is a cross-sectional side view of an illustrative button member having a transparent portion that is covered with a sidewall coating material such as paint in accordance with an embodiment of the present invention.

As shown in FIG. 12, edge 56 of transparent structures 46 may be covered with an opaque structure 58 that is separate from lower button member 44. Structures 58 of FIG. 12 may be formed, for example, from a layer of opaque paint (e.g., white paint).

Figure 13:
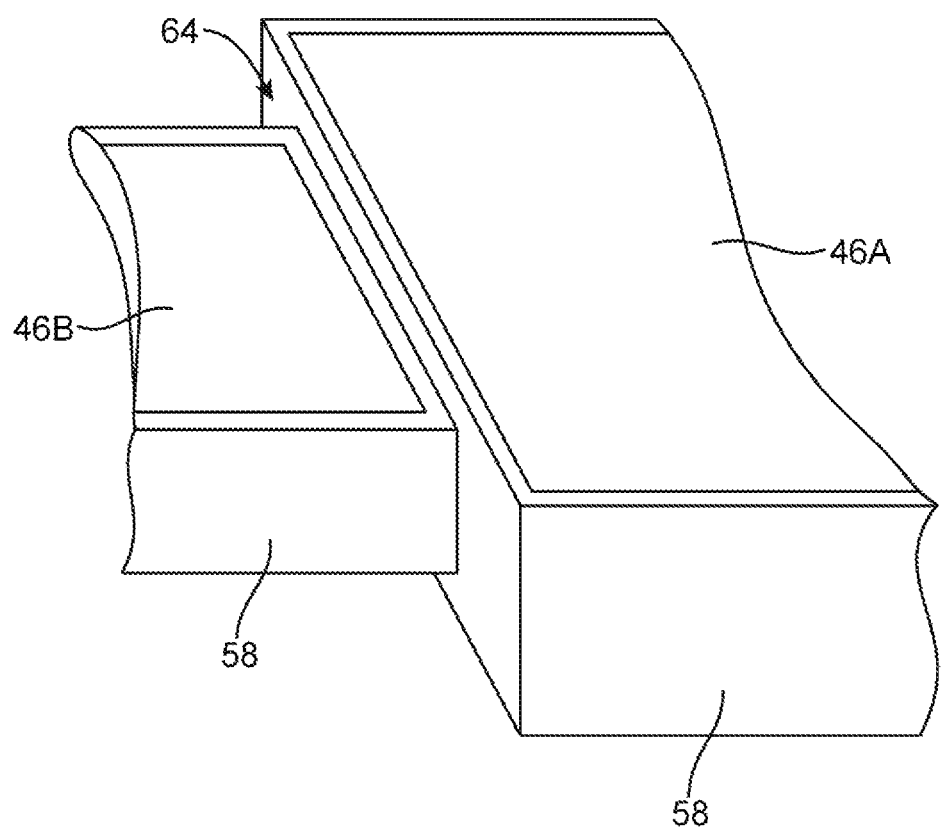
FIG. 13 is a perspective view of two adjoining transparent structures that have been provided with sidewall coatings in accordance with an embodiment of the present invention.

If desired, sidewall coatings can be provided on transparent structures associated with display 14 or other structures in addition to button structures. In the illustrative example of FIG. 13, a portion of device 10 has been provided with two adjoining transparent structures 46A and 46B. Transparent structures 46A and 46B may be formed from glass (e.g., a cover glass layer), plastic, or other transparent materials. When transparent structures 46A and 46B are mounted adjacent to one another, there is an opportunity for dirt to enter a crack or other opening 64 between structures 46 structures 46A and 46B. Because dirt entering opening 64 may tend to block light from entering the edges of both layer 46A and layer 46B, the arrangement of FIG. 13 uses covering structures 58 to cover the edges of transparent layer 46A and to cover the edges of transparent layer 46B.

Figure 14:
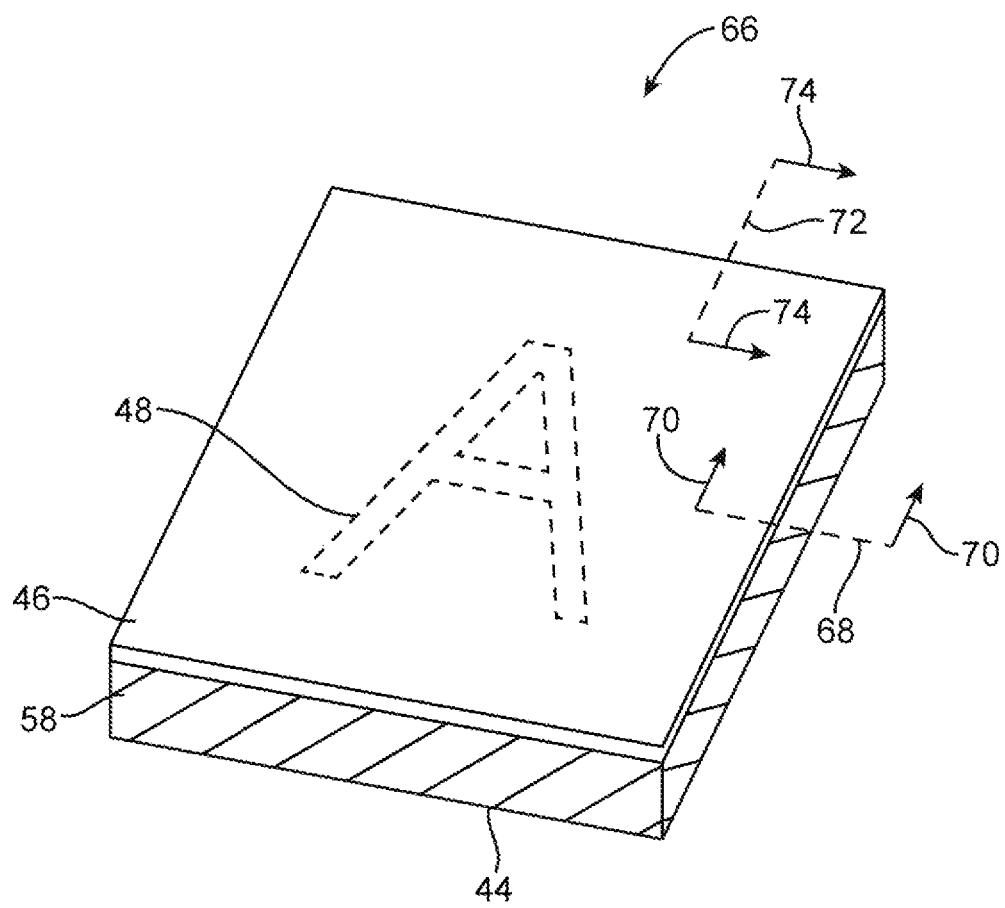
FIG. 14 is a perspective view of a keyboard key with a transparent structure and sidewall structures on edge portions of the transparent structure in accordance with an embodiment of the present invention.

FIG. 14 is a perspective view of an illustrative key for a keyboard such as keyboard 16 of FIG. 1. As shown in FIG. 14, key 66 may have an opaque base member such as member 44 and a transparent member 46 (formed, for example, using a two-shot molding process or by attaching a transparent glass layer to an opaque plastic base member, etc.). Transparent member 46 may cover the upper surface of member 44. A patterned ink layer or other pattern may be used to form label 48. Label 48 may be used to identify key 66 and may include a letter, number, etc. Sidewall structures 58 or other covering layers (e.g., a layer of paint) may be used to cover some or all of the edges of layer 46. As an example, three of the four edges of rectangular key 48 may be covered with sidewall structures. The three edges of key 48 that are covered may be the left, right, and lower edges.

Figure 15:
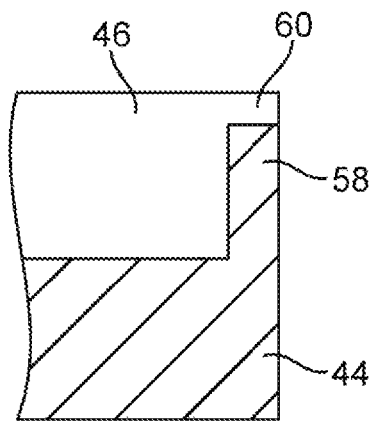
FIG. 15 is a cross-sectional side view of an illustrative key of the type shown in FIG. 14 showing how sidewall structures may be formed along some of the transparent edges of the key in accordance with an embodiment of the present invention.

FIG. 15 is a cross-sectional side view of key 66 of FIG. 14 taken along line 68 on the right-hand side of key 66 and viewed in direction 70. As shown in FIG. 15, portion 60 of transparent structure 46 may protrude over the upper edge of sidewall 58 on member 44.

Figure 16:
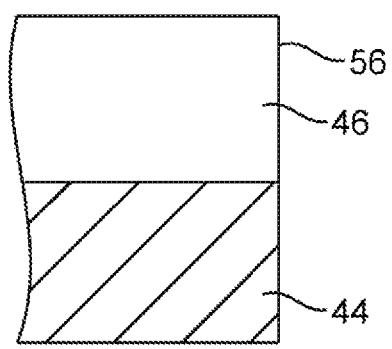
FIG. 16 is a cross-sectional side view of an illustrative key of the type shown in FIG. 14 showing how sidewall structures need not be formed along all edge surfaces of the transparent layer in the key in accordance with an embodiment of the present invention.

FIG. 16 is a cross-sectional side view of key 66 of FIG. 14 taken along line 72 on the upper edge of key 66 and viewed in direction 74. As shown in FIG. 14, transparent structure 46 may be formed on top of member 44 without covering edge 56.

If desired, keys such as key 66 and other structures may be surrounded on all four sides, on three of four sides, or on less than three sides with covering structures such as an opaque sidewall or coating layer. The example of FIGS. 14, 15, and 16 is merely illustrative.

Figure 17:
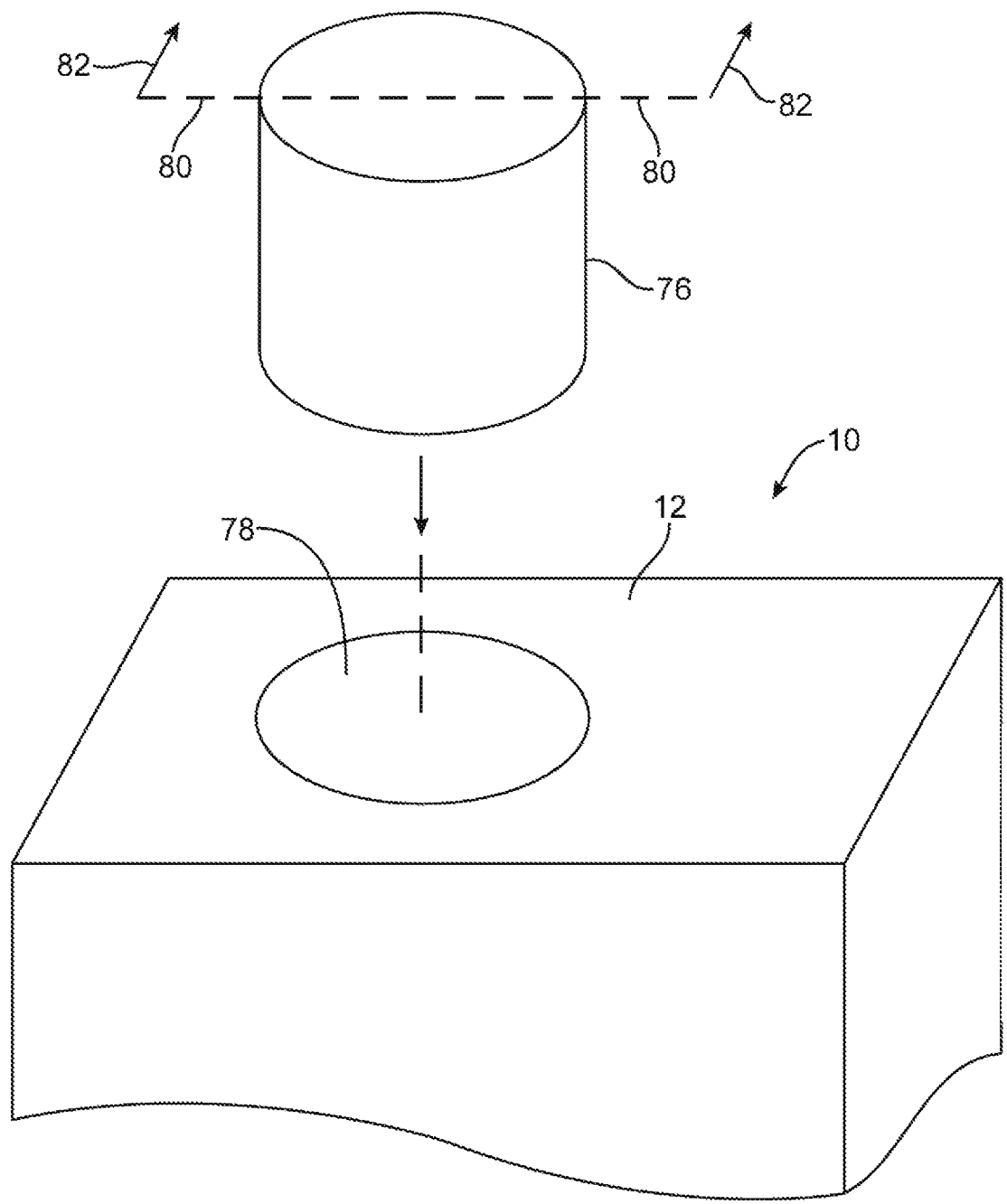
FIG. 17 is a perspective view of an illustrative port in an electronic device and an associated cover structure for the port that has a transparent portion in accordance with an embodiment of the present invention.

Device 10 may include ports for connectors (e.g., audio jack connectors, 30-pin data connectors, or other connectors). As shown in FIG. 17, port 78 may have an opening in housing 12. A mating port cover such as port cover 76 may be placed in port 78 when it is desired to protect port 78 from exposure to the environment. In the example of FIG. 17, port 78 has a cylindrical opening shape and port cover 76 has mating cylindrical shape. This is merely illustrative. Port 78 and port cover 76 may have any suitable shapes.

Figure 18:
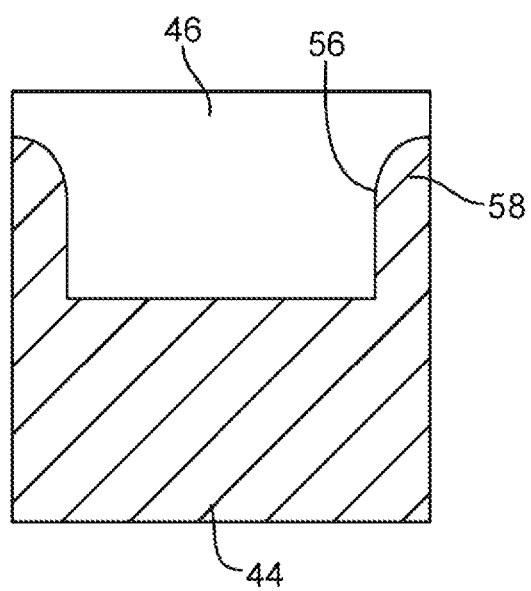
FIG. 18 is a cross-sectional side view of the port cover of FIG. 17 showing how sidewall structures may be used to cover at least some of the edge portions of the transparent portion of the port cover in accordance with an embodiment of the present invention.

A cross-sectional side view of port cover 76 taken along line 80 and viewed in direction 82 is shown in FIG. 18. As shown in FIG. 18, port cover 76 may have portions such as opaque portion 44 and transparent portion 46 (e.g., plastic parts formed from a two-shot molding process, glass and plastic parts, etc.). Sidewall structures 58 or other covering structures may be used to cover edge portions 56 of transparent layer 46. A portion such as portion 60 of transparent layer 60 may protrude over the upper edge of structure 58 or structures 58 may cover the entire surface of edge 56 as described in connection with FIG. 10.

The foregoing is merely illustrative of the principles of this invention and various modifications can be made by those skilled in the art without departing from the scope and spirit of the invention.

What is claimed is:

1. An electronic device structure, comprising:
   a layer of opaque material and
   a transparent layer attached to the layer of opaque material, wherein the transparent layer has a top surface, a bottom surface and at least one edge,
   wherein the layer of opaque material comprises a lower member on the bottom surface of the transparent layer and a vertically protruding sidewall that covers at least part of the at least one edge, and wherein the vertically protruding sidewall has different heights at different locations along the at least one edge.

2. The electronic device structure defined in claim 1 wherein the at least one edge has an edge area and wherein vertically protruding sidewall covers at least half of the edge area.

3. The electronic device structure defined in claim 1 wherein the layer of opaque material and the transparent layer form a button member.

4. The electronic device structure defined in claim 3 wherein the layer of opaque material comprises plastic.

5. The electronic device defined in claim 4 wherein the layer of opaque material comprises white plastic.

6. The electronic device defined in claim 3 wherein the button member comprises structures forming a label.

7. The electronic device defined in claim 4 wherein the layer of opaque material comprises paint.

8. The electronic device defined in claim 3 wherein the transparent layer has a circular outline.

9. The electronic device defined in claim 1 wherein the edge has an area and wherein the vertically protruding sidewall configured to cover at least half of the edge area.

10. The electronic device defined in claim 1 wherein the transparent layer and the layer of opaque material form part of a port cover.

11. The electronic device defined in claim 1 wherein the transparent layer and the layer of opaque material form a computer keyboard key.

12. The electronic device define in claim 11 wherein the computer keyboard key has a label that is visible through the transparent layer and wherein the computer keyboard key has at least three edges that are each at least half covered by the vertically protruding sidewall.

13. The electronic device defined in claim 12 wherein the layer of opaque material comprises paint.

14. A button member, comprising:
    an opaque layer; and
    a transparent layer attached to the top portion of the opaque layer, wherein the transparent layer has a top surface, a bottom surface and at least one peripheral edge,
    wherein the opaque layer comprises a lower member on the bottom surface of the transparent layer and a vertically protruding sidewall that covers at least part of the at least one peripheral edge and wherein the vertically protruding sidewall has different heights at different locations of the at least one peripheral edge.

15. Electronic device structures, comprising:
    a first structure having a first transparent layer attached to a first opaque layer, the first transparent layer having a top surface, a bottom surface and at least one edge, the first structure having first opaque sidewall structures that cover at least some of the at least one edge of the first transparent layer; and
    a second structure having a second transparent layer attached to a second opaque layer, the second transparent layer having a top surface, a bottom surface and at least one edge, the second structure having second opaque sidewall structures that cover at least some of the at least one edge of the second transparent layer,
    wherein the first opaque sidewall structures vertically protrude from a lower member of the first opaque layer and the second opaque sidewall structures vertically protrude from a lower member of the second opaque layer, and wherein the first opaque sidewall structures have different heights at different locations of the at least one edge of the first transparent layer and the second opaque sidewall structures have different heights at different locations of the at least one edge of the second transparent layer.

16. The electronic device structures defined in claim 15 wherein the first opaque sidewall structures and the second opaque sidewall structures comprise plastic sidewalls that are mounted adjacent to each other.

\* \* \* \* \*